(12) United States Patent
Dehod

(10) Patent No.: US 6,666,169 B2
(45) Date of Patent: Dec. 23, 2003

(54) NECK EXTENDING METHOD AND HEADGATE THEREFORE

(75) Inventor: Wendi Dehod, Box 88, Waskatenau, Alberta (CA), TOA 3PO

(73) Assignees: Wendi Dehod; Ben-Don Innovations Inc.

( * ) Notice: Subject to any disclaimer, the term of this patent is extended or adjusted under 35 U.S.C. 154(b) by 11 days.

(21) Appl. No.: 10/095,244

(22) Filed: Mar. 12, 2002

(65) Prior Publication Data

US 2003/0172881 A1 Sep. 18, 2003

(51) Int. Cl.⁷ .............................. A01K 1/062
(52) U.S. Cl. ....................... 119/731; 119/734
(58) Field of Search ................. 119/729, 731, 119/732, 734; 280/30

(56) References Cited

U.S. PATENT DOCUMENTS

| | | | | |
|---|---|---|---|---|
| 839,252 A | * | 12/1906 | Alkire | |
| 4,201,157 A | * | 5/1980 | Lambert | 119/512 |
| 4,498,425 A | * | 2/1985 | Aanestad | 119/729 |
| 4,517,924 A | * | 5/1985 | McCan et al. | 119/734 |
| 5,970,920 A | * | 10/1999 | Peacock | 119/14.08 |
| 6,035,808 A | * | 3/2000 | Herman | 119/512 |

FOREIGN PATENT DOCUMENTS

| | | | | |
|---|---|---|---|---|
| FR | 2684518 A1 | * | 6/1993 | A01K/1/06 |
| GB | 2100965 A | * | 1/1983 | A01K/1/00 |

* cited by examiner

Primary Examiner—Robert P. Swiatek

(57) ABSTRACT

A headgate apparatus comprises a pair of vertically oriented shoulder bars separated by a space that is wide enough to accommodate the neck and narrow enough to prevent passage of the shoulders therebetween. A pair of vertically oriented head bars is mounted in front of the shoulder bars and separated by a space that is wide enough to accommodate the neck and narrow enough to prevent passage of the head therebetween. The head bars and shoulder bars are separated by a head separation distance sufficient to restrain backward and forward motion of the animal. A method of restraining an animal comprises maintaining the head separated from the shoulders by a distance substantially equal to the length of the neck.

4 Claims, 4 Drawing Sheets

NECK EXTENDING METHOD AND HEADGATE THEREFORE

This invention is in the field of equipment for handling animals and in particular devices for restraining animals.

BACKGROUND

Devices are well known for restraining cattle and like animals to allow for various procedures such as testing, vaccination, branding, and so forth. Such devices commonly include a squeeze mechanism to apply pressure to the sides of the animal, a headgate, and a tailgate. Conventional headgates typically provide a pair of bars that move together behind the animal's head to a position adjacent to the neck. The bars may be curved to follow the contours of the neck. The bars also may squeeze against the neck, but this can be dangerous to the animal, and so typically the animal can move forward and backward the length of the neck, from the head to the shoulders. Such conventional headgates are disclosed in U.S. Pat. Nos. 3,814,060 to Swenson and 5,263,438 to Cummings. A squeeze chute incorporating a headgate is disclosed in U.S. Pat. No. 5,111,773 to Akins.

Injections of medicine, vaccine or the like are preferably made in the neck of cattle. Making such injections is difficult with existing headgates, since the animal can move back and forth along the length of the neck. The operator typically reaches through the side of the squeeze behind the headgate, or through the headgate from the front in order to reach the neck and do the injection. Restrained animals are often agitated and move in the headgate, often causing delay, broken needles, misplaced injections, or injury to the operator or the animal.

Present head restraining devices include a nose bar, which is attached to the animals nose and pushes the head back against the bars of the headgate. The device requires attachment and manipulation about the animal's head, and when in place, the neck is not readily accessible. A head table can also be used, where a tether is placed around the head and winched to secure the head to a table. With these the neck is accessible, but the table must be moved away to allow the animal to exit, and requires considerable time to deploy. These present head restraints are difficult and hazardous to use when an animal is agitated, as is commonly the case. Such present devices as well tend to increase agitation because of the movement required around the animal's head when installing and releasing the devices, and the forces exerted on the animal.

Head restraining devices are also disclosed in U.S. Pat. Nos. 3,777,715 to Hill et al. and 4,162,685 to Knappenberger.

SUMMARY OF THE INVENTION

It is the object of the present invention to provide a headgate that includes a mechanism for restraining an animal's head with the neck extending forward from the headgate, accessible for injections and the like. It is a further object of the invention to provide such a headgate that is adjustable to accommodate animals having necks with varying lengths.

It is a further object of the invention to provide a method of restraining an animal that comprises maintaining the head separated from the shoulders by a distance substantially equal to the length of the neck.

The invention provides, in one aspect, a headgate apparatus for restraining an animal having shoulders located at a front portion of a body of the animal, a neck extending forward from the shoulders, and a head located on a front end of the neck. The apparatus comprises a pair of vertically oriented shoulder bars movable between an open exit position, wherein the shoulder bars are separated by a space sufficient to allow the animal to pass between the shoulder bars, and a closed position, wherein the shoulder bars are separated by a space that is wide enough to accommodate the neck and narrow enough to prevent passage of the shoulders therebetween. A pair of vertically oriented head bars is mounted in front of the shoulder bars and are movable between an open exit position, wherein the head bars are separated by a space sufficient to allow the animal to pass between the head bars, and a closed position, wherein the head bars are separated by a space that is wide enough to accommodate the neck and narrow enough to prevent passage of the head therebetween, and wherein further in the closed position the head bars and shoulder bars are separated by a head separation distance sufficient to restrain backward and forward motion of the animal.

The invention provides, in a second aspect, a method of temporarily restraining an animal having shoulders located at a front portion of a body of the animal, a neck extending forward from the shoulders, and a head located on a front end of the neck. The method comprises restraining the body of the animal; positioning a pair of vertically oriented shoulder bars in a closed position such that one shoulder bar is adjacent each side of the neck in proximity to a corresponding shoulder; positioning a pair of vertically oriented head bars in a closed position such that one head bar is adjacent each side of the neck in proximity to the head; releasing the body and moving the head bars and shoulder bars away from the neck into an open position wherein the head bars are separated by a space sufficient to allow the animal to pass between the head bars, and the shoulder bars are separated by a space sufficient to allow the animal to pass between the shoulder bars.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 6 FIG. 5 is a schematic top view of the embodiment of in FIG. 1 with the head and shoulder bars in the open entrance position;

Figure 1:
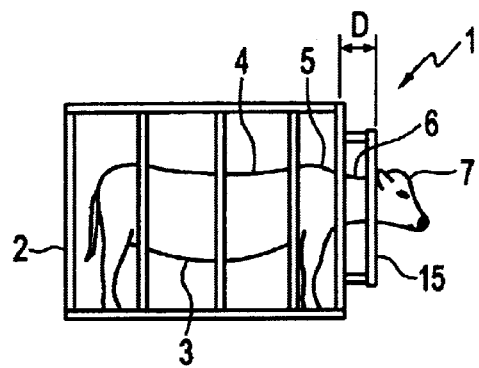
FIG. 1 is a schematic side view of an embodiment of the invention with the head and shoulder bars in the closed position restraining an animal.
Figure 2:
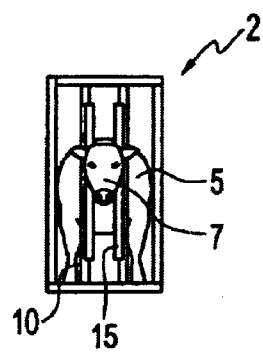
FIG. 2 is a schematic front view of the embodiment of in FIG. 1 in the position of FIG. 1.
Figure 3:
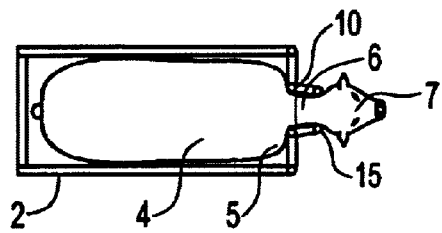
FIG. 3 is a schematic top view of the embodiment of in FIG. 1 in the position of FIG. 1.

DETAILED DESCRIPTION OF THE ILLUSTRATED EMBODIMENTS:

FIGS. 1–5 schematically illustrate a headgate apparatus 1 of the invention for restraining an animal 3 having shoulders 5 located at a front portion of a body 4 of the animal, a neck 6 extending forward from the shoulders 5, and a head 7 located on a front end of the neck 6. The apparatus 1 is illustrated mounted on the front end of a conventional squeeze chute 2 as is known in the art and comprises a pair of vertically oriented shoulder bars 10 movable between an open exit position, illustrated in FIG. 5, wherein the shoulder bars 10 are separated by a space sufficient to allow the animal 3 to pass between the shoulder bars 10, and a closed position., illustrated in FIGS. 1–4 and as best seen in FIG. 3, wherein the shoulder bars 10 are separated by a space that is wide enough to accommodate the neck 6 and narrow enough to prevent passage of the shoulders 10 therebetween. The shoulder bars 10 are illustrated as straight, but could also be curved to more closely conform to, the animal being restrained, as is known in conventional headgates.

A pair of vertically oriented head bars 15 is mounted in front of the shoulder bars 10. The head bars 15 are movable from an open exit position, illustrated in FIG. 5, wherein the head bars 15 are separated by a space sufficient to allow the animal 3 to pass between the head bars 15, and a closed position, illustrated in FIGS. 1–3 and best seen in FIG. 3, wherein the head bars 15 are separated by a space that is wide enough to accommodate the neck 6 and narrow enough to prevent passage of the head 7 therebetween. In the closed position the head bars 15 and shoulder bars 10 are separated by a head separation distance D sufficient to restrain backward and forward motion of the animal 3.

Figure 4:
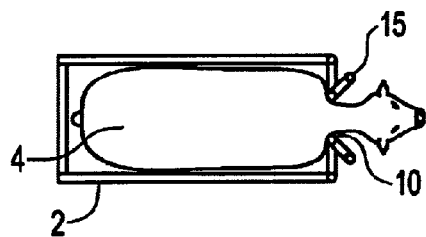
FIG. 4 is a schematic top view of the embodiment of in FIG. 1 with the head bars in the open position and with the shoulder bars in the closed position.

FIG. 4 illustrates an intermediate position of the head bars 15. From the closed position of FIG. 3, the head bars 15 are moved to the intermediate position of FIG. 4 to first release the head 7 while the shoulder bars 10 are maintained in position. The shoulder bars 10 are then swung forward as illustrated in FIG. 5 to allow the animal 3 to move forward.

Figure 5:
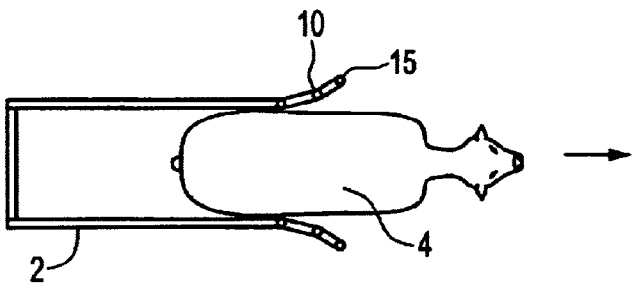
FIG. 5 is a schematic top view of the embodiment of in FIG. 1 with the head and shoulder bars in the open exit position.
Figure 6:
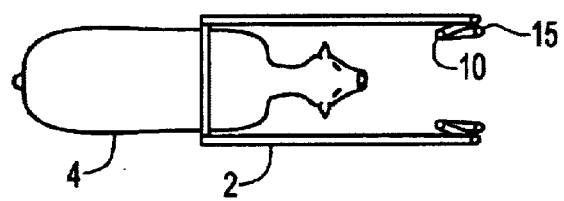

FIG. 6 illustrates the head and shoulder bars 10, 15 in an open entrance position to receive a second animal 3 entering the apparatus 1 from the rear, after the first animal 3 has exited toward the front as illustrated in FIG. 5. Animals 3 thus enter the apparatus 1 from a rear side thereof and exit the apparatus towards a front side thereof. The shoulder bars 10 are oriented such that they move forward from the closed position of FIG. 3 to the open exit position of FIG. 5 to allow the animal 3 to move forward and out of the apparatus 1, and oriented such that the shoulder bars 10 move rearward of the closed position to the open entrance position of FIG. 6 to allow an animal to enter the apparatus. In the open entrance position of FIG. 6 the shoulder bars are oriented to allow the head 7 to pass between the shoulder bars 10, but the shoulders 5 of the animal 3 push the shoulder bars 10 forward and into the closed position as the animal 3 moves forward.

Figure 7:
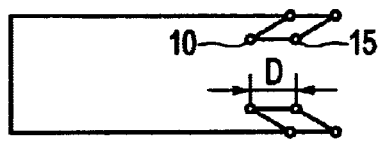
FIG. 7 is a schematic top view of an embodiment wherein the shoulder and head bars are linked so as to move together, shown in the open entrance position.
Figure 8:
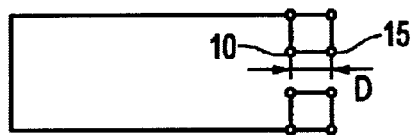
FIG. 8 is a schematic top view of the embodiment of FIG. 7 in the closed position.
Figure 9:
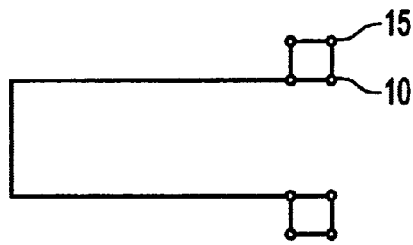
FIG. 9 is a schematic top view of the embodiment of FIG. 7 in the open exit position.

In the embodiment of FIGS. 7–9, the shoulder bars 10 and head bars 15 are linked such that the head bars 15 are linked such that the head bars 15 are maintained at a substantially constant head separation distance D ahead of the shoulder bars 10 when moving from the open position illustrated in FIG. 9 to the closed position illustrated in FIG. 8, and wherein the constant head separation distance corresponds substantially to a distance between the shoulders and head of the animal.

Figure 10:
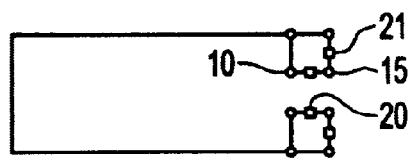
FIG. 10 is a schematic top view of the embodiment of FIG. 7 in the closed position including adjusters to vary the head separation distance.
Figure 11:
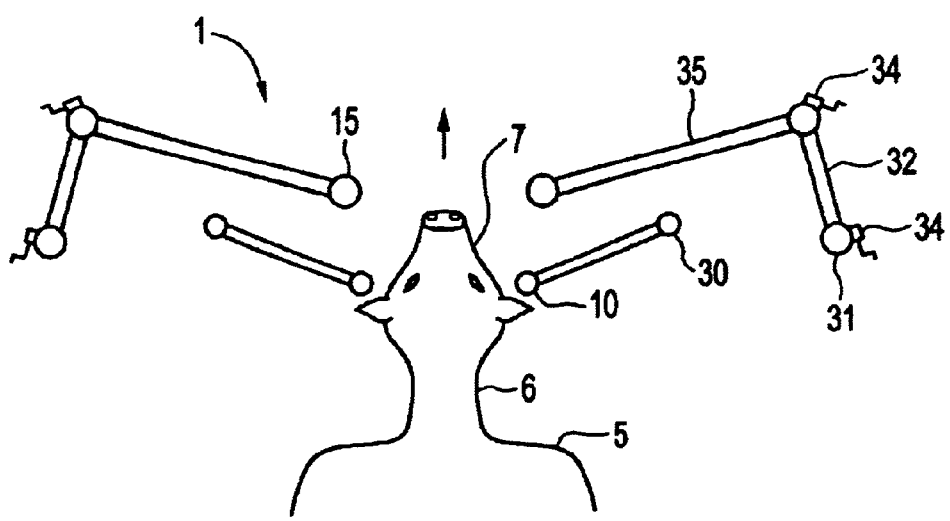
FIG. 11 is a schematic top view of an embodiment wherein the shoulder and head bars move independently of each other, shown in the open entrance position.
Figure 12:
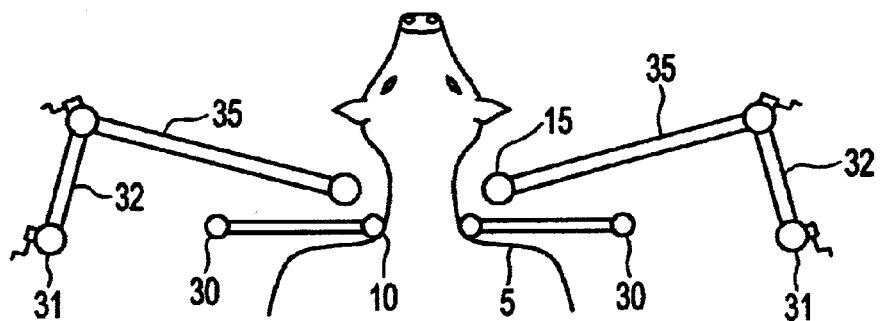
FIG. 12 is a schematic top view of the embodiment of FIG. 11 where the shoulder bars are in the closed position and the head bars are in the open entrance position.
Figure 13:
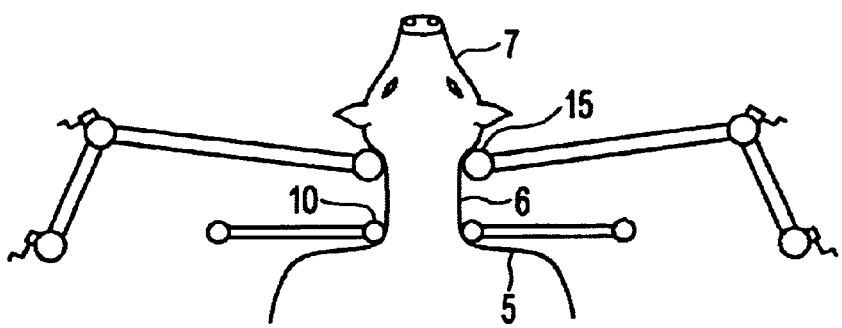
FIG. 13 is a schematic top view of the embodiment of FIG. 11 where the shoulder and head bars are in the closed position.
Figure 14:
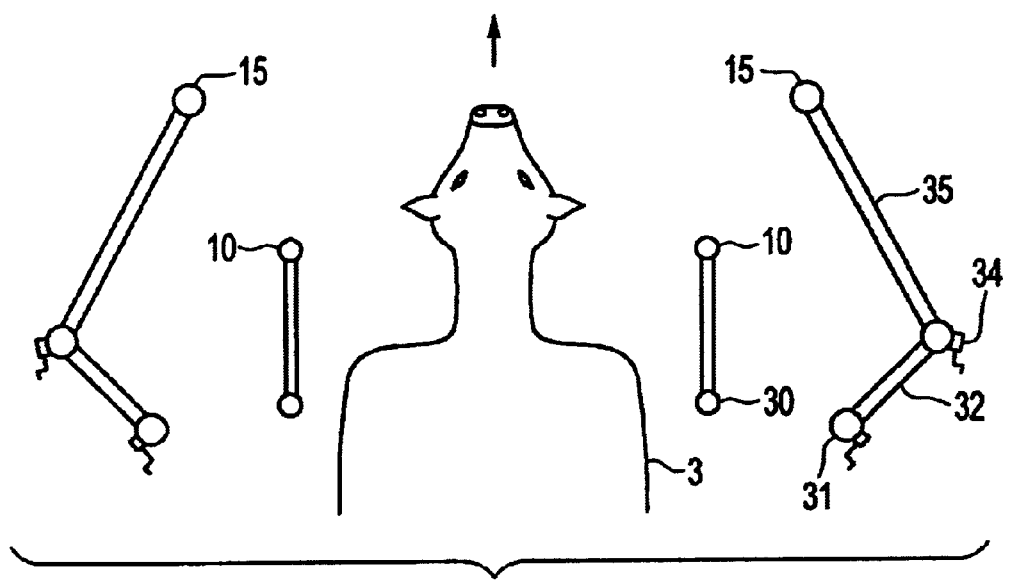
FIG. 14 is a schematic top view of the embodiment of FIG. 11 where the shoulder and head bars are in the open exit position.

FIG. 10 illustrates an apparatus wherein the head separation distance D can be increased or decreased by an adjusting mechanism 20, such as ratcheting telescoping members, a screw, or like mechanism. A second adjusting mechanism 21 allows the proper spacing between the head bars 10 to be maintained to prevent the head 7 from passing therebetween.

FIGS. 11–14 schematically illustrate an embodiment of the invention wherein the head bars 15 move independently of the shoulder bars 10. The shoulder bars 10 pivot about the shoulder pivot posts 30 fixed to the squeeze chute 2. As the animal 3 moves into the apparatus 1 the shoulder bars 10 are pushed forward by the animal's shoulders 5 from the open entrance position of FIG. 11 to the closed position of FIG. 12 where the shoulder bars latch. When the latch is released the shoulder bars can be moved into the open exit position of FIG. 14.

First head bar arms 32 are pivotally attached to head pivot posts 31 fixed to the squeeze chute 2. The pivotal position of the first head bar arms 32 with respect to the head pivot posts 31 is controlled by a crank mechanism 34. The crank mechanism 34 includes a crank release that allows the first head bar arms 32 to also pivot freely with respect to the head pivot posts 31 when desired. Second head bar arms 35 are pivotally attached to the ends of the first heads bar arms 32 and the pivotal position of the second head bar arms 35 with respect to the first head bar arms 32 is controlled by another crank mechanism 34.

Thus the head bars 15 move independently, of the shoulder bars 10. As the animal 3 moves from the position of FIG. 12 to that of FIG. 13 the head bars 15 can remain still. Once the shoulder bars are latched the crank mechanisms 34 are activated to maneuver the head bars 10 into the closed position of FIG. 13. To release the animal, the crank mechanisms 34 are activated again, and the crank release may be activated, to move the head bars 15 into the open exit position of FIG. 14. Conveniently, the first and second head bar arms 32, 35 can be linked such that a crank mechanism 34 on one side moves the arms and head bars 15 on both sides together.

The crank mechanism 34, or the adjusting mechanism 20, can operate to move the head bars 15 forward away from the shoulder bars 10 to put some tension on the neck 6 if desired to more tightly restrain the neck 6.

Thus the invention comprises a method of temporarily restraining an animal 3 having shoulders 5 located at a front portion of a body 4 of the animal, a neck 6 extending forward from the shoulders 5, and a head 7 located on a front end of the neck 6. The method comprises restraining the body 4 of the animal 3 in a squeeze chute 2; positioning a pair of vertically oriented:shoulder bars 10 in a closed position such that one shoulder bar 10 is adjacent each side of the neck 6 in proximity to a corresponding shoulder 5, and positioning a pair of vertically oriented head bars 10 in a closed position such that one head bar 10 is adjacent each side of the neck 6 in proximity to the head 7. Once any procedures on the animal are complete, the body 4 is released and the head bars 15 and shoulder bars 10 are moved away from the neck 6 into an open position wherein the head bars 15 and the shoulder bars 10 are separated by a space sufficient to allow the animal 3 to pass between them.

When the head and shoulder bars are in the closed position, a further force can be exerted in a direction to further separate the head 7 and shoulders 5 and thereby exert a tension on the neck 6.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. A headgate apparatus for restraining an animal having shoulders located at a front portion of a body of the animal, a neck extending forward from the shoulders, and a head located on a front end of the neck, the apparatus comprising:
   a pair of vertically oriented shoulder bars movable between an open exit position, wherein the shoulder bars are separated by a space sufficient to allow the animal to pass between the shoulder bars, and a closed position, wherein the shoulder bars are separated by a space that is wide enough to accommodate the neck and narrow enough to prevent passage of the shoulders therebetween;
   a pair of vertically oriented head bars mounted in front of the shoulder bars and movable between an open exit position, wherein the head bars are separated by a space sufficient to allow the animal to pass between the head bars, and a closed position, wherein the head bars are separated by a space that is wide enough to accommodate the neck and narrow enough to prevent passage of the head therebetween, and wherein further in the closed position the head bars and shoulder bars are separated by a head separation distance sufficient to restrain backward and forward motion of the animal;
   wherein the shoulder bars and head bars are linked such that the head bars are maintained at a substantially constant head separation distance from the shoulder bars when moving to the closed position, and wherein the constant head separation distance corresponds substantially to a distance between the shoulders and head of the animal.

2. A headgate apparatus for restraining an animal having shoulders located at a front portion of a body of the animal, a neck extending forward from the shoulders, and a head located on a front end of the neck, the apparatus comprising:
   a pair of vertically oriented shoulder bars movable between an open exit position, wherein the shoulder bars are separated by a space sufficient to allow the animal to pass between the shoulder bars, and a closed position, wherein the shoulder bars are separated by a space that is wide enough to accommodate the neck and narrow enough to prevent passage of the shoulders therebetween;
   a pair of vertically oriented head bars mounted in front of the shoulder bars and movable between an open exit position, wherein the head bars are separated by a space sufficient to allow the animal to pass between the head bars, and a closed position, wherein the head bars are separated by a space that is wide enough to accommodate the neck and narrow enough to prevent passage of the head therebetween, and wherein further in the closed position the head bars and shoulder bars are separated by a head separation distance sufficient to restrain backward and forward motion of the animal;
   an adjusting mechanism operative to adjust the head separation distance when the head bars and shoulder bars are in the closed position.

3. The apparatus of claim 2 wherein the head bars move independently of the shoulder bars.

4. A method of temporarily restraining an animal having shoulders located at a front portion of a body of the animal, a neck extending forward from the shoulders, and a head located on a front end of the neck, the method comprising:
   restraining the body of the animal;
   positioning a pair of vertically oriented shoulder bars in a closed position such that one shoulder bar is adjacent each side of the neck in proximity to a corresponding shoulder;
   positioning a pair of vertically oriented head bars in a closed position such that one head bar is adjacent each side of the neck in proximity to the head;
   when the head and shoulder bars are in the closed position, exerting a further force in a direction to further separate the head bars and shoulder bars and thereby exert a tension on the neck;
   releasing the body and moving the head bars and shoulder bars away from the neck into an open position wherein the head bars are separated by a space sufficient to allow the animal to pass between the head bars, and the shoulder bars are separated by a space sufficient to allow the animal to pass between the shoulder bars.

* * * * *